(12) United States Patent
Yan

(10) Patent No.: US 10,175,082 B1
(45) Date of Patent: Jan. 8, 2019

(54) PLASTIC COVER CAPABLE OF QUANTITATIVELY DISCHARGING POWDER

(71) Applicant: SHANGHAI FENGQI INDUSTRIAL CO., LTD., Shanghai (CN)

(72) Inventor: Jun Yan, Shanghai (CN)

(73) Assignee: SHANGHAI FENQI INDUSTRIAL CO., LTD., Shanghai (CN)

( * ) Notice: Subject to any disclaimer, the term of this patent is extended or adjusted under 35 U.S.C. 154(b) by 0 days.

(21) Appl. No.: 15/893,894

(22) Filed: Feb. 12, 2018

(30) Foreign Application Priority Data

Sep. 24, 2017 (CN) ............... 2017 2 1229003 U

(51) Int. Cl.
*G01F 11/18* (2006.01)
*G01F 11/26* (2006.01)
*B65D 41/04* (2006.01)
*B65D 83/06* (2006.01)

(52) U.S. Cl.
CPC ............ *G01F 11/261* (2013.01); *B65D 41/04* (2013.01); *B65D 83/06* (2013.01); *G01F 11/18* (2013.01)

(58) Field of Classification Search
CPC ....... G01F 11/261; G01F 11/18; B65D 41/04; B65D 83/06
USPC .... 222/181.1, 184, 197, 199, 200, 339, 344, 222/359, 361, 362, 448, 499, 559
See application file for complete search history.

(56) References Cited

U.S. PATENT DOCUMENTS

| 2,240,030 A * | 4/1941 | Bobrick | A47K 5/10 222/231 |
| 2,983,408 A * | 5/1961 | Schwartz | G01F 11/18 222/284 |
| 4,109,835 A * | 8/1978 | Castro | G01F 11/40 222/449 |
| 4,531,658 A * | 7/1985 | Galopin | G01F 11/18 222/181.2 |
| 4,708,265 A * | 11/1987 | Bopst | G01F 11/10 222/284 |
| 5,421,491 A * | 6/1995 | Tuvim | A47J 31/404 222/336 |
| 5,685,461 A * | 11/1997 | Mitchell | A47G 19/34 222/184 |
| 5,758,803 A * | 6/1998 | Liao | G01F 11/38 222/185.1 |
| 6,749,091 B2 * | 6/2004 | Connelly | G01F 11/16 222/181.1 |
| 6,929,158 B2 * | 8/2005 | Smiley | G01F 11/18 222/366 |

(Continued)

*Primary Examiner* — Vishal Pancholi
(74) *Attorney, Agent, or Firm* — Abelman, Frayne & Schwab

(57) ABSTRACT

Provided is a plastic cover capable of quantitatively discharging powder, including an upper cover, a powder discharging box, a slidable spoon, a powder feeding box 4, and a spring, wherein the upper cover is screwed on the powder discharging box, the slidable spoon is arranged between the powder discharging box and the powder feeding box, the spring is arranged in the slidable spoon, with one end being connected to the powder feeding box and the other end connected to the slidable spoon. With the plastic cover capable of quantitatively discharging powder, the powder can be taken out quantitatively, and the structure is simple, the use is convenient, and the operation is easy.

5 Claims, 3 Drawing Sheets

(56) References Cited

U.S. PATENT DOCUMENTS 6,962,274 B1 * 11/2005 Sherman ................ G01F 11/18
222/344

* cited by examiner

PLASTIC COVER CAPABLE OF QUANTITATIVELY DISCHARGING POWDER

CROSS-REFERENCE TO RELATED APPLICATIONS

This application claims priority to Chinese Patent Application No. 201721229003.8, filed on Sep. 24, 2017 with the State Intellectual Property Office (SIPO) of the People's Republic of China and entitled "Plastic Cover capable of Quantitatively Discharging Powder", the contents of which are herein incorporated by reference in their entirety.

TECHNICAL FIELD

The present disclosure relates to a packaging can, and particularly to a plastic cover capable of quantitatively discharging powder.

BACKGROUND ART

All of powder packaging cans currently in the market are embodied as common covers, and in the using process, users need to additionally use a spoon, which process is complex and tedious. Due to that the user has to directly contact the powder spoon with a hand, thus easily causing secondary pollution, moreover, in the process of scooping out the powder, the powder is easy to sprinkle, and the quantity of the powder scooped is not accurate.

SUMMARY

In order to solve the problems above, embodiments of the present disclosure is to provide a plastic cover capable of quantitatively discharging powder, which is able to change the using habit of using a spoon to obtain powder and achieves accurate powder discharge quantity.

In order to achieve the above object, a technical solution of the present disclosure is:

a plastic cover capable of quantitatively discharging powder, including an upper cover, a powder discharging box, a slidable spoon, a powder feeding box and a spring, wherein the upper cover is in threaded connection with the powder discharging box; the powder discharging box includes a first hollow cylindrical body and a first separator plate provided inside the first hollow cylindrical body, the first separator plate divides the first hollow cylindrical body into a first upper hollow cylindrical body and a first lower hollow cylindrical body, a first opening and grooves are provided on a side face of the first lower hollow cylindrical body, the first separator plate is provided with a second opening; the slidable spoon includes a handle and a hollow column connected to the handle, the hollow column includes a top plate, a side plate, and a cover plate with a bottom face extending outwards, the hollow column is further provided therein with a rib plate to divide the hollow column into a left hollow column and a right hollow column, and a third opening is provided at a portion of the top plate located at the right hollow column; the powder feeding box includes a second hollow cylindrical body and a second separator plate provided inside the second hollow cylindrical body, the second separator plate divides the second hollow cylindrical body into a second upper hollow cylindrical body and a second lower hollow cylindrical body, the second upper hollow cylindrical body is provided with clamping slots, bosses are provided on an inner side face of the second upper hollow cylindrical body, the second upper hollow cylindrical body is provided therein with guide plates, the guide plates are arranged on the second separator plate, the second separator plate is provided with a fourth opening, and the guide plates are located outside the fourth opening; side plates of the slidable spoon are clamped in the clamping slots, the handle is located outside the second upper hollow cylindrical body, the hollow column is located inside the second upper hollow cylindrical body and between inner sides of the guide plates, and configured to be guided by the guide plates, the first lower hollow cylindrical body is sleeved over the slidable spoon, the first opening is clamped onto the side plate of the hollow column, the second opening is located above the top plate, the first lower hollow cylindrical body and the second upper hollow cylindrical body are overlapped and fixed through cooperation of the grooves and the bosses, the spring is provided inside the left hollow column, and the spring has one end connected to the inner side face of the second upper hollow cylindrical body, and the other end connected to the rib plate.

Furthermore, the upper cover is in threaded connection with the first upper hollow cylindrical body.

Furthermore, the grooves, which are plural in number, are uniformly distributed on the side face of the first lower hollow cylindrical body.

Furthermore, the bosses, which are in the same number as the grooves, are uniformly distributed on the inner side face of the second upper hollow cylindrical body.

Furthermore, spring seats are respectively provided at a place where the second upper hollow cylindrical body is connected with the spring and at a place where the rib plate is connected with the spring.

Due to the use of the above technology, the present disclosure, compared with the prior art, has the following positive effects:

in the present disclosure, a slidable spoon which can be drawn is arranged between the powder feeding box and the powder discharging box, and due to the staggered openings of the powder feeding box and the powder discharging box, quantitative powder may be taken out by drawing the slidable spoon. The structure is simple, the use is convenient, and the operation is easy.

DETAILED DESCRIPTION OF EMBODIMENTS

Below, Examples of the present disclosure are further described in conjunction with figures.

In order to make clearer the objects, technical solutions, and advantages of the present disclosure, below the present disclosure is further described in detail in combination with function figures and flow charts. The exemplary examples below and description thereof are used for explaining the present disclosure, but not limiting the present disclosure.

Figure 1:
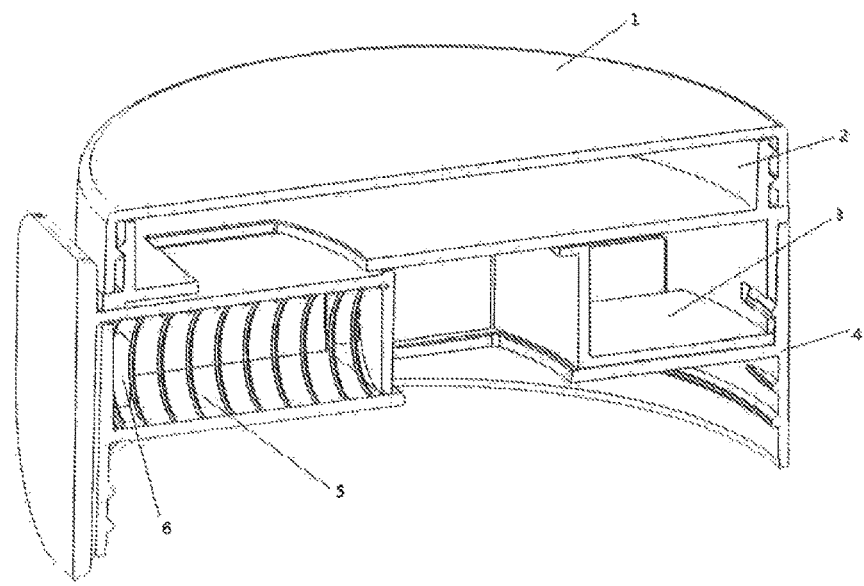
FIG. 1 is a sectional view of an assembled plastic cover capable of quantitatively discharging powder of the present disclosure.
Figure 2:
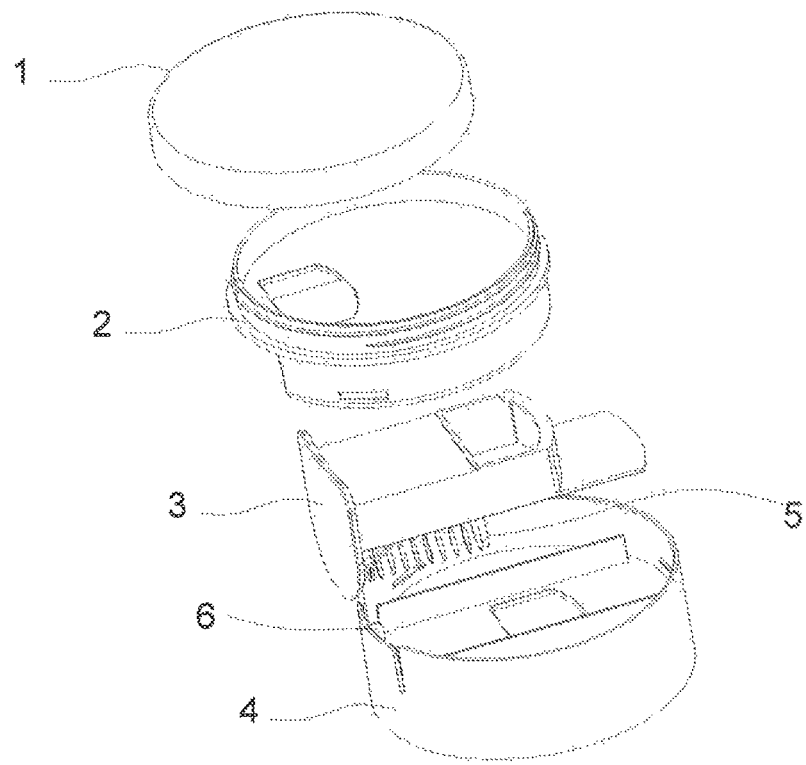
FIG. 2 is an explosive structural schematic view of the plastic cover capable of quantitatively discharging powder of the present disclosure.
Figure 3:
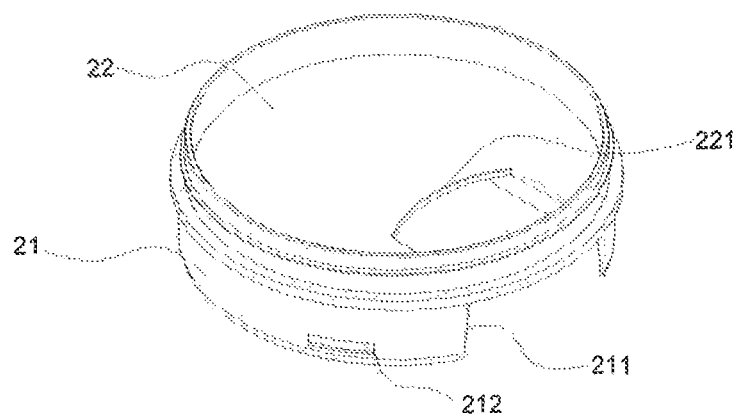
FIG. 3 is a structural schematic view of a powder discharging box of the plastic cover capable of quantitatively discharging powder of the present disclosure.
Figure 4:
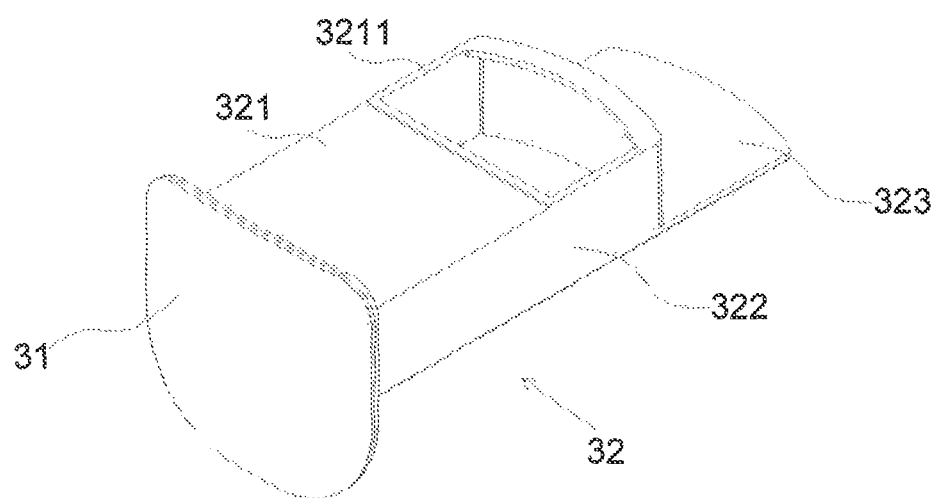
FIG. 4 is a structural schematic view of a slidable spoon of the plastic cover capable of quantitatively discharging powder of the present disclosure.
Figure 5:
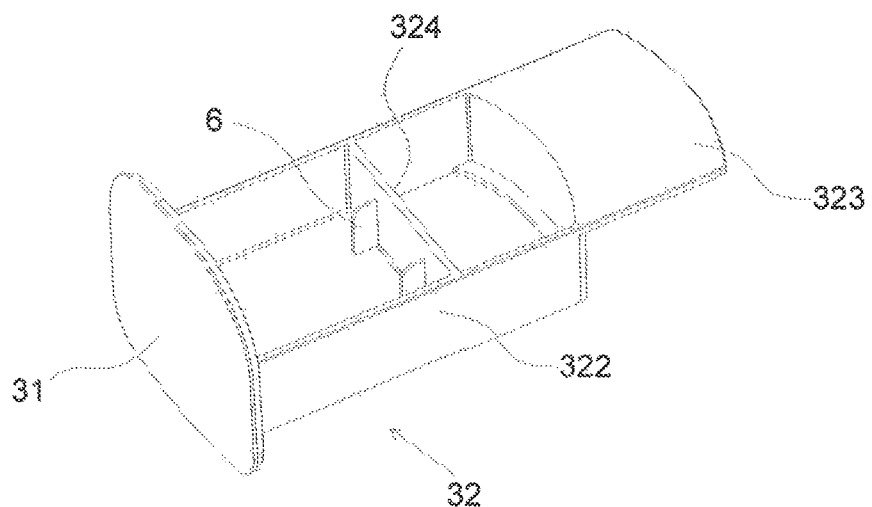
FIG. 5 is a structural schematic view of the slidable spoon of FIG. 3, turned over by 180°.
Figure 6:
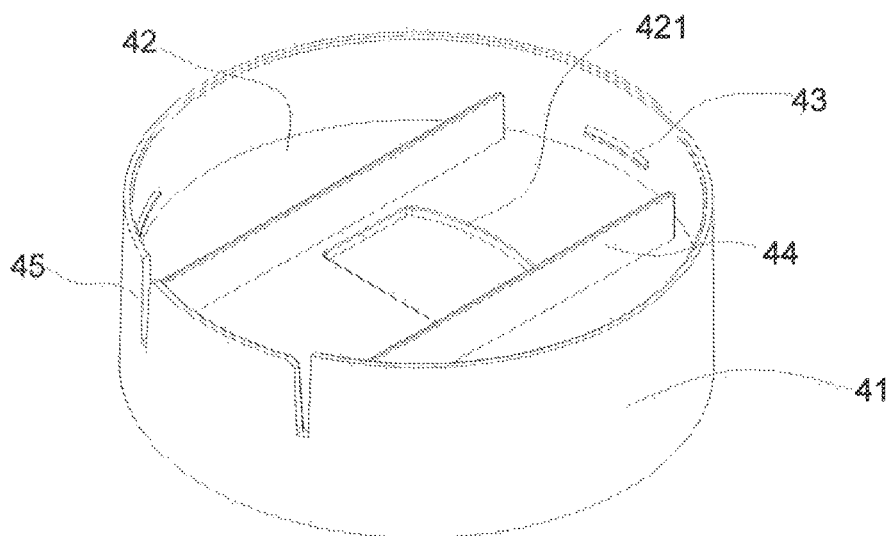
FIG. 6 is a structural schematic view of a powder feeding box of the plastic cover capable of quantitatively discharging powder of the present disclosure.

Referring to FIG. 1 and FIG. 2, a plastic cover capable of quantitatively discharging powder includes an upper cover 1, a powder discharging box 2, a slidable spoon 3, a powder feeding box 4, and a spring 5. The upper cover 1 is screwed on the powder discharging box 2, the slidable spoon 3 is arranged between the powder discharging box 2 and the powder feeding box 4, and the spring 5 is arranged in the slidable spoon 3, with one end being connected to the powder feeding box 4, and the other end connected to the slidable spoon 3.

Specifically, referring to FIG. 1 to FIG. 6, the upper cover 1 is in threaded connection with the powder discharging box 2; the powder discharging box 2 includes a first hollow cylindrical body 21 and a first separator plate 22 provided inside the first hollow cylindrical body 21, the first separator plate 22 divides the first hollow cylindrical body 21 into a first upper hollow cylindrical body and a first lower hollow cylindrical body, a first opening 211 and grooves 212 are provided on the side face of the first lower hollow cylindrical body, and the first separator plate 22 is provided with a second opening 221; the slidable spoon 3 includes a handle 31 and a hollow column 32 connected to the handle 31, the hollow column 32 includes a top plate 321, a side plate 322, and a cover plate 323 with a bottom face extending outwards, the hollow column 32 is further provided therein with a rib plate 324 to divide the hollow column 32 into a left hollow column and a right hollow column, and a third opening 3211 is provided at a portion of the top plate 321 located at the right hollow column; the powder feeding box 4 includes a second hollow cylindrical body 41 and a second separator plate 42 provided inside the second hollow cylindrical body 41, the second separator plate 42 divides the second hollow cylindrical body 41 into a second upper hollow cylindrical body and a second lower hollow cylindrical body, the second upper hollow cylindrical body is provided with clamping slots 45, bosses 43 are provided on the inner side face of the second upper hollow cylindrical body, the second upper hollow cylindrical body is provided therein with guide plates 44, the guide plates 44 are arranged on the second separator plate 42, the second separator plate 42 is provided with a fourth opening 421, and the guide plates 44 are located outside the fourth opening 421; side plates of the slidable spoon 3 are clamped in the clamping slots 45, the handle 31 is located outside the second upper hollow cylindrical body, the hollow column 32, located inside the second upper hollow cylindrical body and between inner sides of the guide plates 44, is able to be guided by the guide plates 44, the first lower hollow cylindrical body is sleeved over the slidable spoon 3, the first opening 211 is clamped onto the side plate of the hollow column 32, the second opening 221 is located above the top plate 321, the first lower hollow cylindrical body and the second upper hollow cylindrical body are overlapped, and fixed through cooperation of the grooves 212 and the bosses 43, the spring 5 is provided inside the left hollow column 32, and the spring 5 has one end connected to the inner side face of the second upper hollow cylindrical body, and the other end connected to the rib plate 324.

The second lower hollow cylindrical body of the powder feeding box 4 may be connected to a powder storing bottle. In a normal state, the slidable spoon 3 is at an original position, the fourth opening 421 is aligned with the third opening 3211. When the powder storing bottle stands upside down, under the effect of gravity, the powder will fall into the slidable spoon 3 through the fourth opening 421 of the powder feeding box 4, and the right hollow column is filled with the powder. The slidable spoon 3 is drawn out by holding the handle 31, so that the third opening 3211 and the second opening 221 are aligned, and the powder in the right hollow column passes through the third opening 3211 and the second opening 221 in sequence to fall into a container, and the slidable spoon 3 automatically returns to the original position under the effect of the spring 5 when being released from the hand.

Preferably, the upper cover 1 is in threaded connection with the first upper hollow cylindrical body.

Preferably, the grooves 212, which are plural in number, are uniformly distributed on the side face of the first lower hollow cylindrical body.

Preferably, the bosses 43 are in the same number as the grooves 212, and are uniformly distributed on the inner side face of the second upper hollow cylindrical body.

Preferably, spring seats 6 are respectively provided at a place where the second upper hollow cylindrical body is connected with the spring 5 and at a place where the rib plate 324 is connected with the spring.

To sum up, with the present disclosure, the powder can be taken out quantitatively, and the structure is simple, the use is convenient, and the operation is easy.

The invention claimed is:

1. A plastic cover capable of quantitatively discharging powder, comprising an upper cover, a powder discharging box, a slidable spoon, a powder feeding box, and a spring, wherein the upper cover is in threaded connection with the powder discharging box; the powder discharging box comprises a first hollow cylindrical body and a first separator plate provided inside the first hollow cylindrical body, the first separator plate divides the first hollow cylindrical body into a first upper hollow cylindrical body and a first lower hollow cylindrical body, a first opening and grooves are provided on a side face of the first lower hollow cylindrical body, the first separator plate is provided with a second opening; the slidable spoon comprises a handle and a hollow column connected to the handle, the hollow column comprises a top plate, a side plate, and a cover plate with a bottom face extending outwards, the hollow column is further provided therein with a rib plate to divide the hollow column into a left hollow column and a right hollow column, and a third opening is provided at a portion of the top plate located at the right hollow column; the powder feeding box comprises a second hollow cylindrical body and a second separator plate provided inside the second hollow cylindrical body, the second separator plate divides the second hollow cylindrical body into a second upper hollow cylindrical body and a second lower hollow cylindrical body, the second upper hollow cylindrical body is provided with clamping slots, bosses are provided on an inner side face of the second upper hollow cylindrical body, the second upper hollow cylindrical body is provided therein with guide plates, the guide plates are arranged on the second separator plate, the second separator plate is provided with a fourth opening, and the guide plates are located outside the fourth opening; side plates of the slidable spoon are clamped in the clamping grooves, the handle is located outside the second upper hollow cylindrical body, the hollow column is located inside the second upper hollow cylindrical body and between inner sides of the guide plates, and configured to be guided by the guide plates, the first lower hollow cylindrical body is sleeved outside the slidable spoon, the first opening is clamped onto the side plate of the hollow column, the second opening is located above the top plate, the first lower hollow cylindrical body and the second upper hollow cylindrical body are overlapped, and fixed through cooperation of the grooves and the bosses, the spring is provided inside the left hollow column, and the spring has one end connected to the inner side face of the second upper hollow cylindrical body, and the other end connected to the rib plate.

2. The plastic cover capable of quantitatively discharging powder according to claim 1, wherein the upper cover is in threaded connection with the first upper hollow cylindrical body.

3. The plastic cover capable of quantitatively discharging powder according to claim 1, wherein the grooves, which are plural in number, are uniformly distributed on the side face of the first lower hollow cylindrical body.

4. The plastic cover capable of quantitatively discharging powder according to claim 1, wherein the bosses, which are in same number as the grooves, are uniformly distributed on the inner side face of the second upper hollow cylindrical body.

5. The plastic cover capable of quantitatively discharging powder according to claim 1, wherein spring seats are respectively provided at a place where the second upper hollow cylindrical body is connected with the spring and at a place where the rib plate is connected with the spring.

* * * * *